United States Patent
Son et al.

(10) Patent No.: US 12,428,526 B2
(45) Date of Patent: Sep. 30, 2025

(54) POLYIMIDE FILM FOR GRAPHITE SHEET, AND GRAPHITE SHEET MANUFACTURED THEREFROM

(71) Applicant: PI Advanced Materials Co., Ltd., Chungcheongbuk (KR)

(72) Inventors: Won Ho Son, Chungcheongbuk (KR); Hyong Sop Jo, Chungcheongbuk (KR)

(73) Assignee: PI Advanced Materials Co., Ltd., Chungcheongbuk-do (KR)

( * ) Notice: Subject to any disclaimer, the term of this patent is extended or adjusted under 35 U.S.C. 154(b) by 760 days.

(21) Appl. No.: 17/772,299

(22) PCT Filed: Sep. 15, 2020

(86) PCT No.: PCT/KR2020/012409
§ 371 (c)(1),
(2) Date: Apr. 27, 2022

(87) PCT Pub. No.: WO2021/085851
PCT Pub. Date: May 6, 2021

(65) Prior Publication Data
US 2022/0372224 A1 Nov. 24, 2022

(30) Foreign Application Priority Data
Oct. 28, 2019 (KR) .................. 10-2019-0134830

(51) Int. Cl.
| | | |
|---|---|---|
| *C08K 3/32* | (2006.01) | |
| *C04B 35/52* | (2006.01) | |
| *C04B 35/524* | (2006.01) | |
| *C04B 35/626* | (2006.01) | |
| *C04B 35/63* | (2006.01) | |
| *C04B 35/634* | (2006.01) | |
| *C08G 73/10* | (2006.01) | |
| *C08J 5/18* | (2006.01) | |
| *C08K 3/26* | (2006.01) | |
| *C08L 79/08* | (2006.01) | |

(52) U.S. Cl.
CPC .......... *C08G 73/1007* (2013.01); *C04B 35/52* (2013.01); *C04B 35/524* (2013.01); *C04B 35/6267* (2013.01); *C04B 35/6306* (2013.01); *C04B 35/63444* (2013.01); *C08G 73/1042* (2013.01); *C08G 73/105* (2013.01); *C08G 73/1078* (2013.01); *C08J 5/18* (2013.01); *C08K 3/26* (2013.01); *C08K 3/32* (2013.01); *C04B 2235/48* (2013.01); *C04B 2235/9607* (2013.01); *C08G 73/1071* (2013.01); *C08K 2003/265* (2013.01); *C08K 2003/325* (2013.01)

(58) Field of Classification Search
None
See application file for complete search history.

(56) References Cited

U.S. PATENT DOCUMENTS

| | | | | |
|---|---|---|---|---|
| 4,568,715 A | * | 2/1986 | Itatani | C08G 73/1071 524/346 |
| 10,351,432 B1 | * | 7/2019 | Won | C01B 32/205 |
| 2019/0144286 A1 | * | 5/2019 | Won | C01B 32/205 423/449.6 |
| 2021/0047485 A1 | * | 2/2021 | Kim | C08K 3/30 |

FOREIGN PATENT DOCUMENTS

| | | | |
|---|---|---|---|
| CN | 101430458 | * | 5/2009 |
| CN | 110272552 | | 9/2019 |
| JP | 2003192788 | | 7/2003 |
| JP | 2015028106 | * | 2/2015 |
| JP | 2016017169 | | 2/2016 |
| JP | 2017160120 | | 9/2017 |
| JP | 2019089688 | | 6/2019 |
| JP | 2021500464 | | 1/2021 |
| KR | 20080066033 | | 7/2008 |
| KR | 20130100296 | | 9/2013 |
| KR | 2015016737 | * | 2/2015 |
| KR | 101951306 | | 2/2019 |
| KR | 20190102560 | | 9/2019 |
| TW | 201524904 | | 7/2015 |
| WO | 2019093821 | | 5/2019 |
| WO | 2019168245 | | 9/2019 |
| WO | WO2019/187621 | * | 10/2019 |

OTHER PUBLICATIONS

Li "Preparation of Poly(amic acid) and Polyimide Derived from 3,3'-Benzophenonetetracarboxylic Dianhydride with Different Diamines by Microwave Irradiation" Journal of Applied Polymer Science vol. 107 (2008) pp. 797-802. (Year: 2008).*
Varma "Effect of Structure on Properties of Polypyromellitimide Films"; Journal of Applied Polymer Science vol. 22 (1984) pp. 1487-1494. (Year: 1984).*

* cited by examiner

*Primary Examiner* — David J Buttner
(74) *Attorney, Agent, or Firm* — Brooks, Cameron & Huebsch, PLLC

(57) ABSTRACT

Disclosed herein are a polyimide film for graphite sheets and a graphite sheet manufactured using the same. The polyimide film is fabricated by imidizing a precursor composition including: a polyamic acid prepared by reacting a dianhydride monomer with a diamine monomer; and an organic solvent, wherein the diamine monomer includes about 30 mol % to about 70 mol % of 4,4'-methylenedianiline and about 30 mol % to about 70 mol % of 4,4'-oxydianiline based on the total number of moles of the diamine monomer, 4,4'-methylenedianiline and 4,4'-oxydianiline being present in total in an amount of about 85 mol % or more based on the total number of moles of the diamine monomer.

4 Claims, No Drawings

POLYIMIDE FILM FOR GRAPHITE SHEET, AND GRAPHITE SHEET MANUFACTURED THEREFROM

TECHNICAL FIELD

The present invention relates to a polyimide film for graphite sheets and a graphite sheet fabricated using the same, and, more particularly, to a polyimide film for graphite sheets, which has good thermal conductivity and can be fabricated at lower cost, and a graphite sheet fabricated using the same.

BACKGROUND ART

Recently, with reduction in weight, size, and thickness and improvement in integration degree, electronic devices suffer from increase in heat generation amount. Heat generated in electronic devices can cause failure, malfunction, and shortened lifespan of the electronic devices. Accordingly, thermal management for electronic devices is emerging as an important issue.

Graphite sheets have larger thermal conductivity than metal sheets such as copper or aluminum and are attracting attention as a heat dissipation member for electronic devices. Such a graphite sheet may be fabricated by various methods, for example, carbonization and graphitization of a polymer film. In particular, polyimide films are favored as a polymer film for graphite sheets due to good mechanical and thermal dimensional stability and chemical stability thereof.

It is known that properties of a graphite sheet fabricated using a polyimide film depend on properties of the polyimide film. Although various polyimide films for graphite sheets have been developed, there is still a need for a polyimide film suitable for fabrication of graphite sheets having further increased thermal conductivity.

DISCLOSURE

Technical Problem

It is one object of the present invention to provide a polyimide film for graphite sheets which has good thermal conductivity.

It is another object of the present invention to provide a polyimide film for graphite sheets which can be fabricated at low cost.

It is a further object of the present invention to provide a graphite sheet fabricated using the polyimide film for graphite sheets set forth above.

Technical Solution

1. In accordance with one aspect of the present invention, a polyimide film for graphite sheets is prepared by imidizing a precursor composition including: a polyamic acid prepared by reacting a dianhydride monomer with a diamine monomer; and an organic solvent, wherein the diamine monomer includes about 30 mol % to about 70 mol % of 4,4'-methylenedianiline and about 30 mol % to about 70 mol % of 4,4'-oxydianiline based on the total number of moles of the diamine monomer, 4,4'-methylenedianiline and 4,4'-oxydianiline being present in total in an amount of about 85 mol % or more based on the total number of moles of the diamine monomer.

2. In embodiment 1, the dianhydride monomer may include at least one selected from the group of pyromellitic dianhydride, 3,3',4,4'-biphenyltetracarboxylic dianhydride, 2,3,3',4-biphenyltetracarboxylic dianhydride, oxydiphthalic anhydride, 3,3',4,4'-diphenylsulfonetetracarboxylic dianhydride, and 3,3',4,4'-benzophenonetetracarboxylic dianhydride.

3. In embodiment 1 or 2, the polyamic acid may be present in an amount of about 10 wt % to about 30 wt % based on the total weight of the precursor composition.

4. In any one of embodiments 1 to 3, the precursor composition may have a viscosity of about 100,000 cP to about 300,000 cP at a temperature of 23° C. and a shear rate of 1 sec$^{-1}$.

5. In any one of embodiments 1 to 4, the precursor composition may further include sublimable inorganic fillers, the sublimable inorganic fillers including at least one selected from the group of calcium carbonate and dicalcium phosphate.

6. In embodiment 5, the sublimable inorganic fillers may be present in an amount of about 0.2 parts by weight to about 0.5 parts by weight relative to 100 parts by weight of the polyamic acid.

7. In accordance with another aspect of the present invention, a graphite sheet is fabricated using the polyimide film according to any one of embodiments 1 to 6.

8. In embodiment 7, the graphite sheet may have a thickness of about 10 μm to about 250 μm.

9. In embodiment 7 or 8, the graphite sheet may have a density of about 1.8 g/cm$^3$ to about 3.0 g/cm$^3$.

10. In any one of embodiments 7 to 9, the graphite sheet may have a coefficient of thermal diffusion of about 795 mm$^2$/s or more.

Advantageous Effects

The present invention provides a polyimide film for graphite sheets which has good thermal conductivity and can be fabricated at low cost, and a graphite sheet fabricated using the same.

BEST MODE

Description of known functions and constructions which may unnecessarily obscure the subject matter of the present invention will be omitted.

It will be further understood that the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. As used herein, the singular forms "a", "an", and "the" are intended to include the plural forms as well, unless the context clearly indicates otherwise.

Further, a numerical value related to a certain component is construed to include a tolerance range in interpretation of components, unless clearly stated otherwise.

As used herein to represent a specific numerical range, the expression "a to b" means "≥a and ≤b".

Polyimide Film for Graphite Sheets

A polyimide film for graphite sheets may be prepared by imidizing a precursor composition including: a polyamic acid prepared by reacting a dianhydride monomer with a diamine monomer; and an organic solvent. Conventionally, 4,4'-oxydianiline has been used as a diamine monomer for fabricating a polyimide film for graphite sheets due to advantages thereof, such as high reactivity, good solubility in organic solvents, and low price. The inventors of the present invention developed the present invention based on confirmation that, when a graphite sheet is fabricated using a polyimide film formed of a diamine monomer that includes about 30 mol % to about 70 mol % (for example, about 30 mol %, about 35 mol %, about 40 mol %, about 45 mol %, about 50 mol %, about 55 mol %, about 60 mol %, about 65 mol %, or about 70 mol %) of 4,4'-methylenedianiline and about 30 mol % to about 70 mol % (for example, about 30 mol %, about 35 mol %, about 40 mol %, about 45 mol %, about 50 mol %, about 55 mol %, about 60 mol %, about 65 mol %, or about 70 mol %) of 4,4'-oxydianiline based on the total number of moles of the diamine monomer, wherein 4,4'-methylenedianiline and 4,4'-oxydianiline are present in total in an amount of about 85 mol % or more (for example, about 85 mol %, about 90 mol %, about 95 mol %, or about 100 mol %) based on the total number of moles of the diamine monomer, the graphite sheet has further increased thermal conductivity without losing the benefits provided by 4,4'-oxydianiline. Further, since 4,4'-methylenedianiline is available at a lower price than 4,4'-oxydianiline, use of 4,4'-methylenedianiline and 4,4'-oxydianiline together as the diamine monomer can reduce manufacturing costs, as compared with using 4-4'-oxydianiline alone.

In one embodiment, the diamine monomer may include about 50 mol % to about 70 mol % of 4,4'-methylenedianiline and about 30 mol % to about 50 mol % of 4,4'-oxydianiline based on the total number of moles of the diamine monomer. In another embodiment, the diamine monomer may include about 60 mol % to about 70 mol % of 4,4'-methylenedianiline and about 30 mol % to about 40 mol % of 4,4'-oxydianiline based on the total number of moles of the diamine monomer. In a further embodiment, the diamine monomer may include about 65 mol % to about 70 mol % of 4,4'-methylenedianiline and about 35 mol % to about 40 mol % of 4,4'-oxydianiline based on the total number of moles of the diamine monomer. However, it will be understood that the present invention is not limited thereto.

In one embodiment, 4,4'-methylenedianiline and 4,4'-oxydianiline may be present in total in an amount of about 90 mol % to about 100 mol % based on the total number of moles of the diamine monomer. In another embodiment, 4,4'-methylenedianiline and 4,4'-oxydianiline may be present in total in an amount of about 95 mol % to about 100 mol % based on the total number of moles of the diamine monomer. In a further embodiment, 4,4'-methylenedianiline and 4,4'-oxydianiline may be present in total in an amount of about 100 mol % based on the total number of moles of the diamine monomer. However, it will be understood that the present invention is not limited thereto.

In one embodiment, a diamine monomer other than 4'-methylenedianiline and 4,4'-oxydianiline may be further used as the diamine monomer without departing from the objects of the present invention. Examples of such a diamine monomer may include p-phenylenediamine, and the like, without being limited thereto. The additional diamine monomer may be present in an amount of about 15 mol % or less (for example, about 0.1 mol %, about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol %, or about 15 mol %), for example, 10 mol % or less, for another example, 5 mol % or less, based on the total number of moles of the diamine monomer.

The dianhydride monomer may include any dianhydride monomer commonly used in the art. Examples of the dianhydride monomer may include pyromellitic dianhydride, 3,3',4,4'-biphenyltetracarboxylic dianhydride, 2,3,3',4-biphenyltetracarboxylic dianhydride, oxydiphthalic anhydride, 3,3',4,4'-diphenylsulfonetetracarboxylic dianhydride, and 3,3',4,4'-benzophenonetetracarboxylic dianhydride, without being limited thereto. In one embodiment, the dianhydride monomer may be pyromellitic dianhydride, which has advantages such as good reactivity and low price, without being limited thereto.

The organic solvent may include any organic solvent that can dissolve the polyamic acid, for example, an aprotic polar organic solvent. Examples of the aprotic polar organic solvents may include amide solvents, such as N,N'-dimethylformamide (DMF) and N,N'-dimethylacetamide (DMAc), phenolic solvents, such as p-chlorophenol and o-chlorophenol, N-methyl-pyrrolidone (NMP), γ-butyrolactone (GBL), and diglyme. These may be used alone or in combination thereof. As needed, an auxiliary solvent, such as toluene, tetrahydrofuran, acetone, methyl ethyl ketone, methanol, ethanol, and water, may be further used to adjust solubility of the polyamic acid. In one embodiment, the organic solvent may be an amide solvent, for example, N,N'-dimethylformamide or N,N'-dimethylacetamide, without being limited thereto.

In one embodiment, the polyamic acid may be present in an amount of about 5 wt % to about 35 wt % (for example, about 5 wt %, about 10 wt %, about 15 wt %, about 20 wt %, about 25 wt %, about 30 wt %, or about 35 wt %) based on the total weight of the precursor composition. Within this range, the precursor composition can have a suitable molecular weight and solution viscosity for forming a film while having good storage stability. The polyamic acid may be present in an amount of, for example, about 10 wt % to about 30 wt %, for another example, about 15 wt % to 20 wt %, based on the total weight of the precursor composition, without being limited thereto.

In one embodiment, the precursor composition may have a viscosity of about 100,000 cP to about 300,000 cP (for example, about 100,000 cP, about 150,000 cP, about 200,000 cP, about 250,000 cP, or about 300,000 cP) at a temperature of 23° C. and a shear rate of 1 sec$^{-1}$. Within this range, the precursor composition can exhibit good processability during formation of the polyimide film while allowing the polyamic acid to have a predetermined weight average molecular weight. Here, the "viscosity" may be measured using a HAAKE Mars rheometer. The precursor composition may have a viscosity of, for example, about 150,000 cP to about 250,000 cP, for another example, about 200,000 cP to about 250,000 cP at a temperature of 23° C. and a shear rate of 1 sec$^{-1}$, without being limited thereto.

In one embodiment, the polyamic acid may have a weight average molecular weight (Mw) of about 100,000 g/mol or more, for example, about 100,000 g/mol to about 500,000 g/mol, without being limited thereto. Within this range, a graphite sheet fabricated using the polyimide film can have further improved thermal conductivity. Here, the "weight average molecular weight" may be measured by gel permeation chromatography (GPC).

In one embodiment, the precursor composition may further include sublimable inorganic fillers. Here, the "sublimable inorganic filler" may refer to inorganic fillers that can be sublimated by heat during a carbonization and/or graphitization process in fabrication of graphite sheets. When the polyimide film includes the sublimable inorganic fillers, pores can be formed in a graphite sheet by a gas generated through sublimation of the sublimable inorganic fillers during manufacture of the graphite sheet, thereby improving flexibility of the graphite sheet and thus improving handleability and moldability of the graphite sheet.

In one embodiment, the sublimable inorganic fillers may have an average particle diameter ($D_{50}$) of about 1.5 µm to about 4.5 µm (for example, about 1.5 µm, about 2 µm, about 2.5 µm, about 3 µm, about 3.5 µm, about 4 µm, or about 4.5 µm). Within this range, the sublimable inorganic fillers can have good dispersibility, can be prevented from being exposed over the surface of the polyimide film, thereby reducing surface defects, and can induce a proper degree of foaming during the carbonization and/or graphitization process, thereby allowing obtainment of a high-quality graphite sheet.

In one embodiment, the sublimable inorganic fillers may be present in an amount of about 0.2 parts by weight to about 0.5 parts by weight (for example, about 0.2 parts by weight, about 0.3 parts by weight, about 0.4 parts by weight, or about 0.5 parts by weight) relative to 100 parts by weight of the polyamic acid. Within this range, the sublimable inorganic fillers can have good dispersibility, can be prevented from being exposed over the surface of the polyimide film, thereby reducing surface defects, and can induce a proper degree of foaming during the carbonization and/or graphitization process, thereby allowing obtainment of a high-quality graphite sheet.

In one embodiment, the sublimable inorganic fillers may include at least one selected from the group of dicalcium phosphate and calcium carbonate, without being limited thereto.

In one embodiment, the polyimide film for graphite sheets may have a thickness of about 20 µm to about 500 µm (for example, about 20 µm, about 30 µm, about 40 µm, about 50 µm, about 60 µm, about 70 µm, about 80 µm, about 90 µm, about 100 µm, about 150 µm, about 200 µm, or about 500 µm). The polyimide film may have a thickness of, for example, about 32 µm to about 100 µm, for another example, about 38 µm to about 62.5 µm, without being limited thereto.

The polyimide film for graphite sheets set forth above may be fabricated by any suitable method known in the art.

In one embodiment, the polyimide film for graphite sheets may be fabricated by a method including: (a) preparing the precursor composition including the polyamic acid by mixing the organic solvent with the diamine monomer and the dianhydride monomer; (b) casting the precursor composition on a support and drying to prepare a gel film; and (c) heating the gel film to form the polyimide film. However, depending on the type of monomers used and the desired properties of the polyimide film, the monomers may be mixed all at once or sequentially in step (a). As a result, partial polymerization between the monomers may occur. Optionally, the method may further include adding the sublimable inorganic fillers after step (a) and before step (b). Here, addition of the sublimable inorganic fillers may be conducted by any suitable method known in the art.

Imidization of the precursor composition for fabrication of the polyimide film may be carried out by, for example, a thermal imidization method, a chemical imidization method, or a complex imidization method in which the thermal imidation method and the chemical imidization are used in combination.

The thermal imidization method is a method of inducing imidization only by heating without using a dehydrating agent and the like, wherein the polyamic acid is formed into a film on a support, followed by heat treatment for about 1 to 8 hours while gradually heating the film in the temperature range of about 40° C. to about 400° C., for example, about 40° C. to about 300° C., thereby obtaining a polyimide film in which the polyamic acid is imidized.

The chemical imidization method is a method of promoting imidization by applying a dehydrating agent and/or an imidizing agent to the precursor composition.

The complex imidization method is a method in which a dehydrating agent and/or an imidizing agent is added to the precursor composition, which, in turn, is formed into a film on a support, and then the film is heated to about 80° C. to about 200° C., for example, about 100° C. to about 180° C. to activate the dehydrating agent and/or the imidizing agent, followed by partially curing and drying the film, and then the film is heated to about 200° C. to about 400° C. for about 5 to 400 seconds, thereby obtaining a polyimide film.

In one embodiment, imidization of the precursor composition may be carried out by the chemical imidization or the complex imidization method. Thus, the method according to the present invention may include adding a dehydrating agent and/or an imidizing agent, for example, after step (a) and before step (b).

Here, the "dehydrating agent" refers to a substance that promotes ring closure of the polyamic acid through dehydration, and may include, for example, aliphatic acid anhydrides, aromatic acid anhydrides, N,N'-dialkylcarbodiimide, lower aliphatic acid halides, halogenated lower fatty acid anhydrides, aryl phosphonic dihalides, and thionyl halides. These may be used alone or as a mixture thereof. Theramong, aliphatic acid anhydrides, such as acetic acid anhydride, propionic acid anhydride, and lactic acid anhydride, are preferred in view of availability and cost. These may be used alone or as a mixture thereof.

Here, the "imidizing agent" refers to a substance that promotes ring closure of the polyamic acid, and may include, for example, aliphatic tertiary amines, aromatic tertiary amines, and heterocyclic tertiary amines. Theramong, heterocyclic tertiary amines are preferred in view of catalytic reactivity. Examples of the heterocyclic tertiary amines may include quinoline, isoquinoline, β-picoline, and pyridine. These may be used alone or as a mixture thereof.

Although the amount of the dehydrating agent and/or the imidizing agent is not particularly restricted, the dehydrating agent may be present in an amount of about 0.5 mol to about 5 mol, for example, about 1 mol to about 4 mol, per mol of an amic acid group in the polyamic acid and the imidizing agent may be present in an amount of about 0.05 mol to about 3 mol, for example, about 0.2 mol to about 2 mol, per mol of the amic acid group in the polyamic acid. Within these ranges, imidization of the precursor composition can be sufficiently achieved and the precursor composition can be easily cast in film form.

In one embodiment, in step (b), the gel film may be obtained by drying the precursor composition cast on the support (for example, a glass plate, aluminum foil, an endless stainless belt, and a stainless drum) at a temperature of about 40° C. to about 300° C., for example, about 80° C. to about 200° C., for another example, about 100° C. to about 180° C. Through the drying process, the dehydrating agent and the imidizing agent are activated, whereby partial curing and drying of the cast precursor composition occurs, resulting in formation of the gel film. Herein, the "gel film" refers to a self-supported film intermediate which is formed in an intermediate stage of conversion of the polyamic acid into polyimide.

As needed, the method according to the present invention may include stretching the gel film to adjust the thickness and size of the finally obtained polyimide film and to improve orientation of the polyimide film. Here, stretching of the gel film may be performed in at least one of the machine direction (MD) and the transverse direction (TD).

The gel film may have a volatile content of about 5 wt % to about 500 wt %, for example, about 5 wt % to about 200 wt %, for another example, about 5 wt % to about 150 wt %, without being limited thereto. Within this range, it is possible to avoid occurrence of defects such as film breakage, uneven color tone, and characteristic variation during subsequent heat treatment for obtaining the polyimide film. Here, the volatile content of the gel film may be calculated according to Equation 1. In Equation 1, A denotes an initial weight of the gel film and B denotes a weight of the gel film after heating the gel film to 450° C. for 20 minutes.

$$(A-B) \times 100/B \qquad \text{<Equation 1>}$$

In one embodiment, in step (c), the gel film may be subjected to heat treatment at a variable temperature range from about 50° C. to about 700° C., for example, from about 150° C. to about 600° C., for another example, from about 200° C. to about 600° C., so as to remove remaining solvent from the gel film and to imidize almost all remaining amic acid groups, thereby obtaining the polyimide film.

As needed, the obtained polyimide film may be subjected to heat-finishing treatment at a temperature of about 400° C. and about 650° C. for about 5 to 400 seconds to be further cured. Here, the heat-finishing treatment may be performed under a predetermined tension to relieve any remaining stress from the obtained polyimide film.

Graphite Sheet

In accordance with another aspect of the present invention, there is provided a graphite sheet fabricated using the polyimide film for graphite sheets set forth above. The graphite sheet fabricated using the polyimide film may have good thermal conductivity.

In one embodiment, the graphite sheet may have a thickness of about 10 μm to about 250 μm (for example, about 10 μm, about 15 μm, about 20 μm, about 25 μm, about 30 μm, about 35 μm, about 40 μm, about 45 μm, about 50 μm, about 75 μm, about 100 μm, or about 250 μm). The graphite sheet may have a thickness of, for example, about 13 μm to about 75 μm, for another example, about 19 μm to about 62.5 μm, without being limited thereto.

In one embodiment, the graphite sheet may have a density of about 1.8 g/cm$^3$ to about 3.0 g/cm$^3$ (for example, about 1.8 g/cm$^3$, about 1.9 g/cm$^3$, about 2 g/cm$^3$, about 2.1 g/cm$^3$, about 2.2 g/cm$^3$, about 2.3 g/cm$^3$, about 2.4 g/cm$^3$, about 2.5 g/cm$^3$, about 2.6 g/cm$^3$, about 2.7 g/cm$^3$, about 2.8 g/cm$^3$, about 2.9 g/cm$^3$, or about 3 g/cm$^3$). Within this range, the graphite sheet can have an increased coefficient of thermal diffusion and thus increased thermal conductivity. The graphite sheet may have a density of, for example, about 2.0 g/cm$^3$ to about 2.8 g/cm$^3$, for another example, about 2.2 g/cm$^3$ to about 2.5 g/cm$^3$, without being limited thereto.

In one embodiment, the graphite sheet may have a coefficient of thermal diffusion of about 795 mm$^2$/s or more (for example, about 795 mm$^2$/s, about 800 mm$^2$/s, about 810 mm$^2$/s, about 820 mm$^2$/s, about 830 mm$^2$/s, about 840 mm$^2$/s, about 850 mm$^2$/s, about 860 mm$^2$/s, about 870 mm$^2$/s, about 880 mm$^2$/s, about 890 mm$^2$/s, or about 900 mm$^2$/s). The graphite sheet may have a coefficient of thermal diffusion of, for example, about 795 mm$^2$/s to about 900 mm$^2$/s, for another example, about 800 mm$^2$/s to about 850 mm$^2$/s, without being limited thereto.

The graphite sheet may be fabricated by any suitable method commonly used in the field of fabricating graphite sheets. For example, the graphite sheet may be fabricated by carbonization and graphitization of the polyimide film.

Here, the carbonization process may be performed at a temperature of, for example, about 1,000° C. to about 1,500° C. for about 1 to 5 hours, without being limited thereto. Through the carbonization process, polymer chains of the polyimide film are thermally decomposed, resulting in formation of a preliminary graphite sheet including a non-crystalline carbon body and/or an amorphous carbon body.

Here, the graphitization process may be performed at a temperature of, for example, about 2,500° C. to about 3,000° C. for about 1 to 10 hours, without being limited thereto. Through the graphitization process, carbon atoms of the non-crystalline carbon body and/or the amorphous carbon body are rearranged, resulting in formation of the graphite sheet.

Next, the present invention will be described in more detail with reference to examples. However, it should be noted that these examples are provided for illustration only and should not be construed in any way as limiting the invention.

EXAMPLE

Example 1

First, 104.02 g of pyromellitic dianhydride as the dianhydride monomer, 47.99 g of 4,4'-methylenedianiline (MDA) and 48.23 g of 4,4'-oxydianiline (ODA) as the diamine monomer, and 800 g of dimethylformamide were mixed together, followed by polymerization, thereby preparing a polyamic acid solution having a final viscosity of 244,000 cP.

Then, 1,000 g of the prepared polyamic acid solution was mixed with 0.5 g of dicalcium phosphate (average particle diameter ($D_{50}$): 2.2 μm) as the sublimable inorganic fillers, and 0.5 mol of β-picoline as the imidizing agent, 3 mol of acetic acid anhydride as the dehydrating agent and 2.5 mol of dimethylformamide per mol of an amic acid group in the polyamic acid, thereby preparing a precursor composition.

Then, the prepared precursor composition was cast onto a glass plate using a high-speed rotary stirrer, followed by drying at 160° C. for 3 minutes, thereby preparing a gel film. Then, the gel film was separated from the glass plate, followed by heat treatment at 280° C. for 4 minutes and heat treatment at 420° C. for 3 minutes, thereby fabricating a polyimide film having a thickness of about 50 μm.

The polyimide film was heated to 1,300° C. at a heating rate of 0.8° C./min under nitrogen gas using an electric furnace, followed by carbonization of the polyimide film by maintaining the temperature for 1 hour. Then, the carbonized polyimide film was heated to 2,800° C. at a heating rate of 3.5° C./min under argon gas, followed by graphitization of the polyimide film by maintaining the temperature for 1 hour, thereby fabricating a graphite sheet.

Examples 2 to 8 and Comparative Examples 1 and 2

Graphite sheets were fabricated in the same manner as in Example 1 except that mol % of 4,4'-methylenedianiline and 4,4'-oxydianiline based on the total number of moles of the diamine monomers, the final viscosity of the polyamic acid solution, and the thickness of each graphite sheet were changed as listed in Table 1.

Property Evaluation
  (1) Viscosity (unit: cP): the viscosity of each of the polyamic acid solutions prepared in Examples and Comparative Examples was measured under conditions of a temperature of 23° C. and a shear rate of 1 sec$^{-1}$ using a viscometer (HAAKE Mars Rheometer, HAAKE Mars).
  (2) Thickness (unit: μm): The thickness of each of the graphite sheets fabricated in Examples and Comparative Examples was measured using a thickness gauge (Micrometer, Mitutoyo Co., Ltd.).
  (3) Coefficient of thermal diffusion (unit: mm$^2$/s): The coefficient of thermal diffusion of each of the graphite sheets fabricated in Examples and Comparative Examples was measured at room temperature under conditions of a voltage of 260 V and a duration 50 ml/s using a thermal diffusion coefficient measuring instrument (LFA467, NETZSCH Group).
  (4) Density (unit: g/cm$^3$): The density of each of the graphite sheets fabricated in Examples and Comparative Examples was measured by an apparent density measurement method using a weight gauge (GH-252, A&D Company) and a thickness gauge (Micrometer, Mitutoyo Co., Ltd.).

range set forth herein had a smaller coefficient of thermal diffusion coefficient than the graphite sheets of Examples 1 to 8.

In addition, Comparative Example 3 in which the amount of 4,4'-methylenedianiline exceeded the range set forth herein and the amount of 4,4'-oxydianiline was less than the range set forth herein failed to form a polyimide film and thus was inadequate for manufacture of a graphite sheet.

It should be understood that various modifications, changes, alterations, and equivalent embodiments can be made by those skilled in the art without departing from the spirit and scope of the present invention.

The invention claimed is:

1. A polyimide film for graphite sheets, the polyimide film being fabricated by imidizing a precursor composition comprising: a polyamic acid prepared by reacting a dianhydride monomer with a diamine monomer; and an organic solvent,
  wherein the diamine monomer comprises about 30 mol % to about 70 mol % of 4,4'-methylenedianiline and about 30 mol % to about 70 mol % of 4,4'-oxydianiline based on the total number of moles of the diamine monomer, 4,4'-methylenedianiline and 4,4'-oxydianiline being present in total in an amount of about 85 mol % or more based on the total number of moles of the diamine monomer,
  wherein the precursor composition comprises a sublimable inorganic filler,
  wherein the sublimable inorganic filler is dicalcium phosphate,
  wherein the sublimable inorganic filler is present in an amount of 0.2 parts by weight to 0.5 parts by weight relative to 100 parts by weight of the polyamic acid, and
  wherein an average particle diameter ($D_{50}$) of the sublimable inorganic filler is 1.5 μm to 4.5 μm.

TABLE 1

|  | MDA (mol %) | ODA (mol %) | Viscosity (cP) | Thickness (μm) | Coefficient of thermal diffusion (mm$^2$/s) | Density (g/cm$^3$) |
|---|---|---|---|---|---|---|
| Example 1 | 50 | 50 | 244,000 | 27 | 809.2 | 2.01 |
| Example 2 | 70 | 30 | 110,000 | 19.5 | 829.5 | 2.20 |
| Example 3 | 70 | 30 | 160,000 | 21 | 837.5 | 2.12 |
| Example 4 | 70 | 30 | 160,000 | 22.5 | 834.7 | 2.19 |
| Example 5 | 70 | 30 | 204,000 | 19.0 | 827.4 | 2.18 |
| Example 6 | 70 | 30 | 204,000 | 20 | 840.0 | 2.25 |
| Example 7 | 70 | 30 | 204,000 | 18.5 | 838.7 | 2.11 |
| Example 8 | 30 | 70 | 222,000 | 21.5 | 802.3 | 2.12 |
| Comparative Example 1 | 0 | 100 | 230,000 | 21.5 | 783.1 | 2.21 |
| Comparative Example 2 | 20 | 80 | 210,000 | 21.0 | 787.3 | 2.17 |
| Comparative Example 3 | 80 | 20 | 230,000 |  | Not measurable |  |

As can be seen from the results shown in Table 1, all of the graphite sheets of Examples 1 to 8 fabricated using polyimide films in which the amounts of 4,4'-methylenedianiline and 4,4'-oxydianiline fell within the ranges set forth herein had a high coefficient of thermal diffusion and were anticipated to have large thermal conductivity.

Conversely, the graphite sheet of Comparative Example 1 fabricated using a polyimide film free from 4,4'-methylenedianiline, and the graphite sheet of Comparative Example 2 fabricated using a polyimide film in which the amount of 4,4'-methylenedianiline was less than the range set forth herein and the amount of 4,4'-oxydianiline exceeded the 2. The polyimide film according to claim 1, wherein the dianhydride monomer comprises at least one selected from the group of pyromellitic dianhydride, 3,3',4,4'-biphenyltetracarboxylic dianhydride, 2,3,3',4-biphenyltetracarboxylic dianhydride, oxydiphthalic anhydride, 3,3',4,4'-diphenylsulfonetetracarboxylic dianhydride, and 3,3',4,4'-benzophenonetetracarboxylic dianhydride.

3. The polyimide film according to claim 1, wherein the polyamic acid is present in an amount of about 10 wt % to about 30 wt % based on the total weight of the precursor composition.

4. The polyimide film according to claim 1, wherein the precursor composition has a viscosity of about 100,000 cP to about 300,000 cP at a temperature of 23° C. and a shear rate of 1 sec$^{-1}$.

* * * * *